(12) United States Patent
Kimura

(10) Patent No.: US 10,586,099 B2
(45) Date of Patent: Mar. 10, 2020

(54) INFORMATION PROCESSING APPARATUS FOR TRACKING PROCESSING

(71) Applicant: CANON KABUSHIKI KAISHA, Tokyo (JP)

(72) Inventor: Mitsuo Kimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 16/014,864

(22) Filed: Jun. 21, 2018

(65) Prior Publication Data

US 2019/0005323 A1 Jan. 3, 2019

(30) Foreign Application Priority Data

Jun. 29, 2017 (JP) .................. 2017-128038

(51) Int. Cl.
*G06K 9/00* (2006.01)
*G06K 9/46* (2006.01)
*G06T 3/00* (2006.01)
*G06T 3/40* (2006.01)

(52) U.S. Cl.
CPC ..... *G06K 9/00449* (2013.01); *G06K 9/00463* (2013.01); *G06K 9/46* (2013.01); *G06K 9/4671* (2013.01); *G06T 3/00* (2013.01); *G06T 3/0006* (2013.01); *G06T 3/40* (2013.01); *G06K 2209/01* (2013.01)

(58) Field of Classification Search
CPC .. G06K 9/00449; G06K 9/00463; G06K 9/46; G06K 9/4671; G06T 3/00; G06T 3/0006; G06T 3/40
See application file for complete search history.

(56) References Cited

U.S. PATENT DOCUMENTS

| 6,075,905 | A | * | 6/2000 | Herman | ............... | G06K 9/32 |
| | | | | | | 348/588 |
| 6,970,591 | B1 | * | 11/2005 | Lyons | ............... | G06K 9/209 |
| | | | | | | 345/419 |
| 8,184,155 | B2 | | 5/2012 | Ke et al. | | |
| 9,392,185 | B1 | * | 7/2016 | Kumar | ............. | H04N 5/2354 |
| 2007/0031063 | A1 | * | 2/2007 | Zhou | ............ | G06K 9/32 |
| | | | | | | 382/284 |

(Continued)

*Primary Examiner* — David F Dunphy
(74) *Attorney, Agent, or Firm* — Canon U.S.A., Inc. IP Division

(57) ABSTRACT

An apparatus obtains first transformation information, such as a first transformation matrix, to be used for coordinate transformation between a coordinate system in an overall image prepared beforehand and a coordinate system in a first captured image, by comparing a feature point extracted from the overall image and a feature point extracted from the first captured image. In a case where the first transformation information is updated, the apparatus generates a partial image from the overall image based on an image-taking position of a just preceding image, and compares a feature point extracted from the partial image with a feature point extracted from a captured image to be used for updating of the first transformation information, and accordingly obtains transformation information for updating. The apparatus updates the first transformation information by using the obtained transformation information for updating. Thus, accuracy of tracking processing is improved.

11 Claims, 11 Drawing Sheets

(56) References Cited

U.S. PATENT DOCUMENTS

| | | | |
|---|---|---|---|
| 2009/0041314 A1* | 2/2009 | Vercauteren | G02B 21/367 382/128 |
| 2015/0229840 A1* | 8/2015 | Sawai | G06T 3/4038 348/36 |
| 2016/0188992 A1* | 6/2016 | Hiraga | G06K 9/4604 382/199 |
| 2016/0282599 A1* | 9/2016 | Shankar | G02B 21/367 |
| 2018/0089533 A1* | 3/2018 | Zagaynov | G06K 9/4671 |

* cited by examiner

FIG.6

| ID | KEY | POINT | WIDTH | HEIGHT |
|---|---|---|---|---|
| 1 | PRODUCT NAME 1 | (100, 300) | 100 | 15 |
| 2 | PRODUCT NAME 2 | (100, 320) | 100 | 15 |
| 3 | PRODUCT NAME 3 | (100, 340) | 100 | 15 |
| 4 | QUANTITY 1 | (220, 300) | 35 | 15 |
| 5 | QUANTITY 2 | (220, 320) | 35 | 15 |
| 6 | QUANTITY 3 | (220, 340) | 35 | 15 |

Purchase Order

Order Number                              Order Date  July 1, 2014

Ordering Company Name   XYZ, Inc.
Address   1-111, ZZZ Town, YYY City, XXX Prefecture         
                        080-1234-1234

Person in Charge   Daijiro Suzuki
We would like to place an order as follows.

| Model Name | Product Name | Quantity | Delivery Date |
|---|---|---|---|
| 2801119 | Inktank Color Cyan | 3 | July 3 |
| 3801120 | Inktank Color Black | 3 | July 3 |
| 4801121 | Inktank Color Magenta | 3 | July 3 |
|  |  |  |  |
|  |  |  |  |
|  |  |  |  |
|  |  |  |  |

Delivery Destination

Destination Company Name   ABC, Inc.

| Department Name   General Affairs Department | Name of Person in Charge   Taro Yamada |
|---|---|
| Delivery Address   1-111, DDD Town, BBB City, AAA Prefecture | |
| Telephone Number   222-22-2222 | Facsimile Number   111-111-1111 |

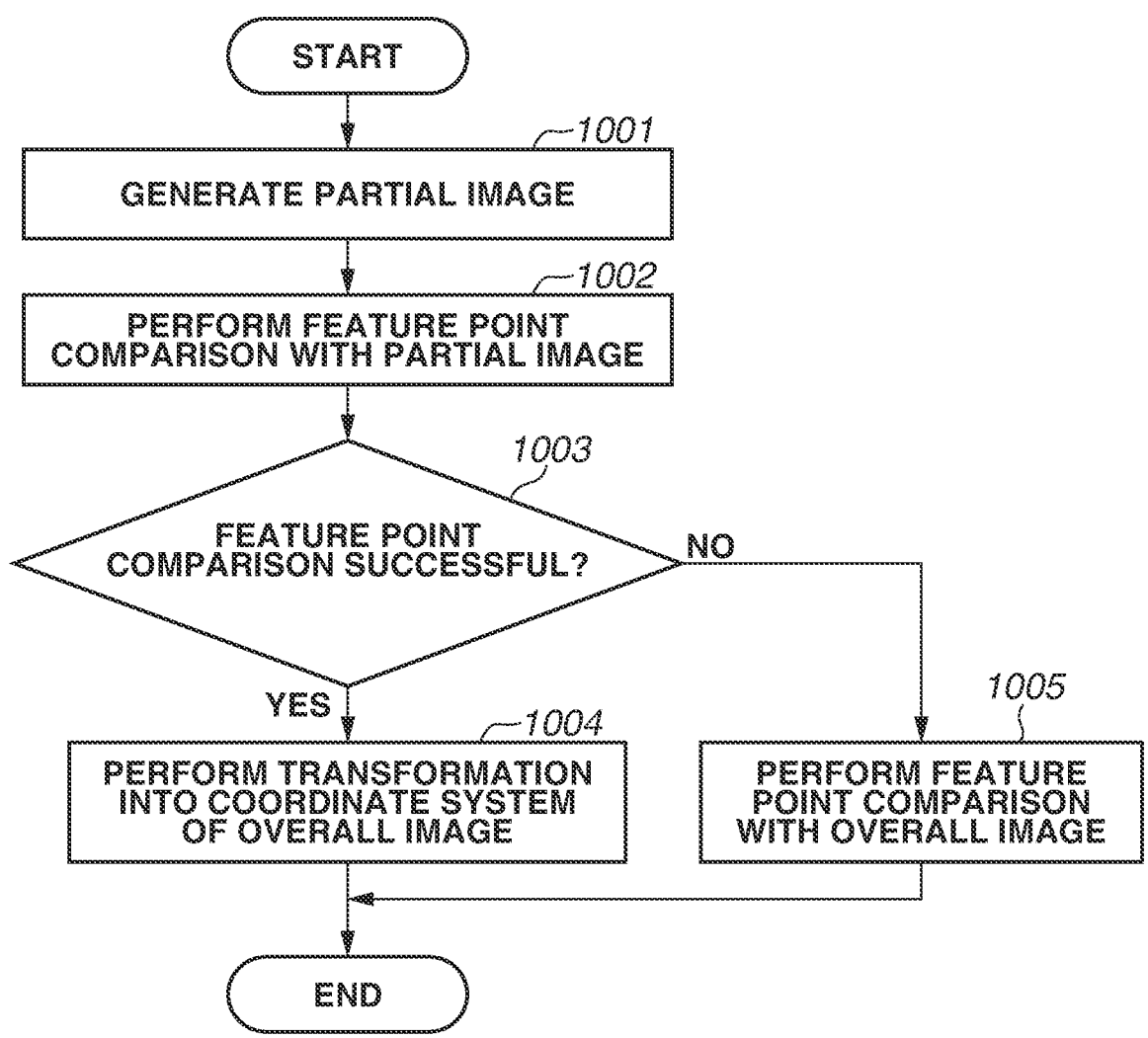

FIG.11

Purchase Order

Order Number  Order Date  July 1, 2014

Ordering Company Name  XYZ, Inc.
Address  1-111, ZZZ Town, YYY City, XXX Prefecture  (SEAL)
080-1234-1234

Person in Charge  Daijiro Suzuki
We would like to place an order as follows.

| Model Name | Product Name | Quantity | Delivery Date |
|---|---|---|---|
| 2801119 | Inktank Color Cyan | 3 | July 3 |
| 3801120 | Inktank Color Black | 3 | July 3 |
| 4801121 | Inktank Color Magenta | 3 | July 3 |
|  |  |  |  |
|  |  |  |  |
|  |  |  |  |
|  |  |  |  |

--- Delivery Destination ---

| Destination Company Name  ABC, Inc. | |
|---|---|
| Department Name  General Affairs Department | Name of Person in Charge  Taro Yamada |
| Delivery Address  1-111, DDD Town, BBB City, AAA Prefecture | |
| Telephone Number  222-22-2222 | Facsimile Number  111-111-1111 |

1100, 1101, 1102, 1103, 1104

INFORMATION PROCESSING APPARATUS FOR TRACKING PROCESSING

BACKGROUND OF THE INVENTION

Field of the Invention

The present invention relates to tracking processing.

Description of the Related Art

Mobile terminals provided with a camera have become widespread. Conventionally, users have been using machines such as a scanner to capture image data of a paper document. However, capturing an image with the camera of a mobile terminal has made it possible to acquire image data of a paper document easily. U.S. Pat. No. 8,184,155 discusses a technique for recognizing and tracking a display area and coordinates of a digital document captured using a camera.

SUMMARY OF THE INVENTION

An information processing apparatus according to an exemplary embodiment includes a processor, and a memory that stores instructions, wherein the processor executes the instructions to perform obtaining of first transformation information to be used for coordinate transformation between a coordinate system in an overall image prepared beforehand and a coordinate system in a first captured image, by executing feature point comparison processing for comparing a feature point extracted from the overall image and a feature point extracted from the first captured image, obtaining second transformation information to be used for coordinate transformation between the coordinate system in the first captured image and a coordinate system in a second captured image, by executing feature point tracing processing for tracing a position of a feature point in the second captured image when the first transformation information is obtained, based on the feature point extracted from the first captured image used in obtaining the first transformation information, obtaining third transformation information to be used for coordinate transformation between a coordinate system in a captured image immediately before a third captured image and a coordinate system in the third captured image, by executing feature point tracing processing for tracing a position of a feature point in the third captured image, based on a feature point extracted from the captured image immediately before the third captured image, mapping an image-taking position corresponding to the third captured image on the overall image, based on the first transformation information, the second transformation information, and the third transformation information, generating a partial image from the overall image, based on the mapped image-taking position, in a case where the first transformation information is to be updated, and updating the first transformation information by using transformation information for updating, upon obtaining the transformation information for updating to be used for coordinate transformation between the coordinate system in the overall image and a coordinate system in a fourth captured image, by executing feature point comparison processing for comparing the feature point extracted from the partial image and a feature point extracted from the fourth captured image to be used for updating of the first transformation information.

Further features of the present invention will become apparent from the following description of exemplary embodiments with reference to the attached drawings.

BRIEF DESCRIPTION OF THE DRAWINGS

FIG. 6 is a diagram illustrating an example of a data extraction area.

FIG. 10 is a diagram illustrating a feature point comparison flow.

FIG. 11 is a diagram illustrating an example of a partial image.

DESCRIPTION OF THE EMBODIMENTS

Figure 1:
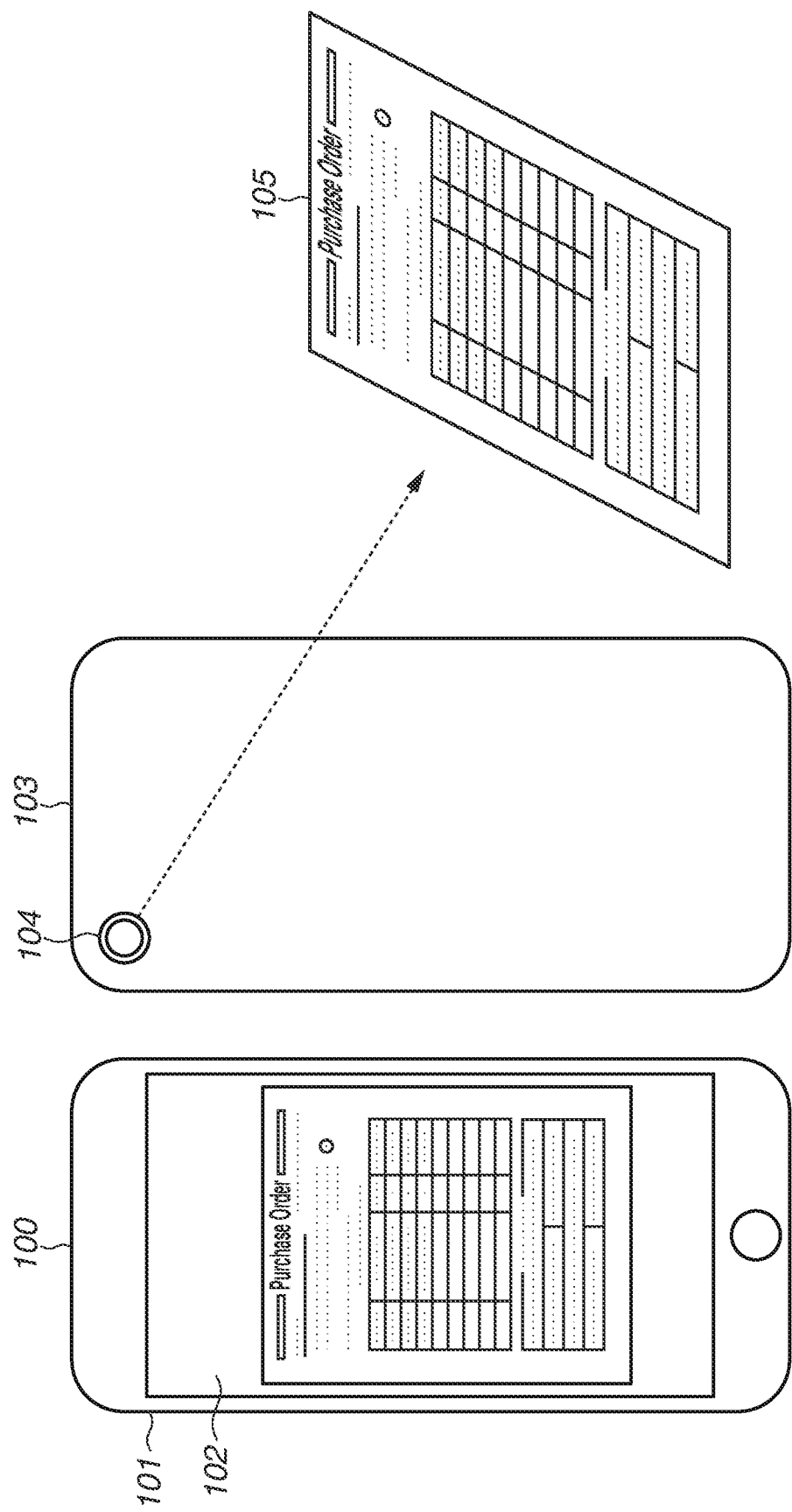
FIG. 1 is a diagram illustrating an example of an exterior appearance of a mobile terminal.

The present specification discusses a configuration for acquiring optical character recognition (OCR) result information in a local area of a paper-document image captured with a camera. Assume that, in acquiring OCR result information, the position coordinates of an area (a data input area) describing information to be acquired is known (e.g., a business form in a known format). In this case, an area for OCR processing can be identified and therefore, an OCR result may be acquired by subjecting this area to the OCR processing. In this case, if a subject is relatively small, such as a business card or a driver's license, an image of resolution sufficient for OCR can be obtained, even if the entire subject is photographed. However, as for a paper document of a relatively large size such as A4 or A3, if an image of the entire document is captured and subjected to the OCR processing, the accuracy of the acquired OCR result information deteriorates. This is because the resolution with respect to an area subjected to the OCR processing decreases due to an increase in the distance between the subject and the camera, and in addition, a blur occurs in a detailed part of the captured image. Therefore, to improve the accuracy in the acquisition of the OCR result information, it would be necessary to approach a target area and capture an enlarged image, even if a paper document of a relatively large size such as A4 or A3 is used. In a case where the business form in a known format is photographed, if the current photographing range of the form can be identified, an OCR processing target area (a data input area) can be identified based on a relative position relationship. Therefore, the target area may be enlarged and photographed. Hence, it is conceivable that, first, an OCR processing target area may be identified by capturing the overall document image, and an area to be photographed may be displayed as a guide by highlighting a part of the target area with a line such as a red frame. The highlighting is performed to prompt a user to enlarge and photograph the identified target area. Further, it is conceivable that the guiding-display may be continued by tracking and highlighting the area, while the user gradually brings the camera close to the OCR processing target area of the document, after the overall document image is captured. By guiding the user to an area to be enlarged and photographed, the user can efficiently perform photographing and acquire an OCR result, without enlarging and photographing an unnecessary part.

On the other hand, to identify the current photographing range of a form being captured, a feature point of a captured image and a feature point of the entire business form in the known format are compared. In such processing, a processing load is high. Therefore, it is difficult to perform this processing for all the frames of a photographic moving image. Hence, it is conceivable that the following may be performed. First, the feature point comparison processing is performed to compare the feature points of the captured image and the entire business form in the known format to identify an initial photographing range. Next, feature point tracing processing is performed to trace the movement amount of a feature point between frames of the moving image, accordingly tracking a photographing range and an OCR processing target area. U.S. Pat. No. 8,184,155 discusses a method for recognizing and tracking a display area and a location of a digital document, by using an invisible junction feature amount. In this method, once the display area and the location are identified using the invisible junction feature amount, a feature point between video frames is traced, and accordingly a planar movement (projection transformation) between the video frames can be estimated.

Assume that a photographing range and an OCR processing target area are tracked by tracing a feature point between frames of a moving image. In such a case, errors in the feature point tracing processing between the frames are gradually accumulated, and a positional deviation of the target area increases. Assume that, in a state where the position of the OCR processing target area is deviated due to the accumulation of the errors in the tracking, the OCR processing is applied to the area. In this case, there is a possibility that necessary information may be off the area and thus may not be recognized. Therefore, the positional deviation caused by the accumulation of the errors in the tracking is regularly corrected. Hence, it is conceivable that the feature point comparison processing may be regularly performed to compare a feature point of a frame image being captured with a feature point of the entire business form in the known format. The current photographing range is accordingly regularly re-identified, so that the positional deviation is corrected. However, the feature point comparison processing easily fails, in a case where the feature point comparison processing is performed to compare a feature point of the enlarged photographic image corresponding to a part of a subject photographed with a camera, which is brought close to the subject, and a feature point of the entire business form in the known format. The reason for this is as follows: The feature points of the business form are extracted from an enlarged photographic image corresponding to a part of the form, and the number of the extracted feature points becomes small. Therefore, when a comparison with feature points of the entire form is performed, there is a possibility that more than one portions having a feature point matching with a feature point of the enlarged photographic image may be found from the entire business form.

A mobile terminal (a portable terminal) having a camera function will be described as an example of an information processing apparatus for addressing the above-described issue. FIG. 1 is a diagram illustrating an example of an external appearance of the mobile terminal. A mobile terminal 100 includes various units (101 to 104). On a front face 101 of the mobile terminal 100, a touch panel 102 is provided. The touch panel 102 has a function of serving as a display (a display unit) for displaying information such as an image (a moving image). The touch panel 102 also has a function of serving as an input unit for inputting an instruction according to a touch operation of a user. Further, the mobile terminal 100 includes a camera 104 provided on a back face 103 of the mobile terminal 100. The camera 104 is provided to capture a photographic image, by photographing a subject 105 such as a paper document. The user of the mobile terminal 100 can start processing, by launching a mobile application (a mobile software application) to be described below, and taking an image of the subject 105 by using the camera 104. The subject 105 in FIG. 1 is a purchase order, which is an A4-size paper document. The subject 105 is not limited to the paper document. Examples of the subject 105 can include business cards, pictures, and cards of various sizes. The mobile application to be described below can capture an image of the subject 105 by using the camera 104, and output the image to the touch panel 102 to display the image.

Figure 2:
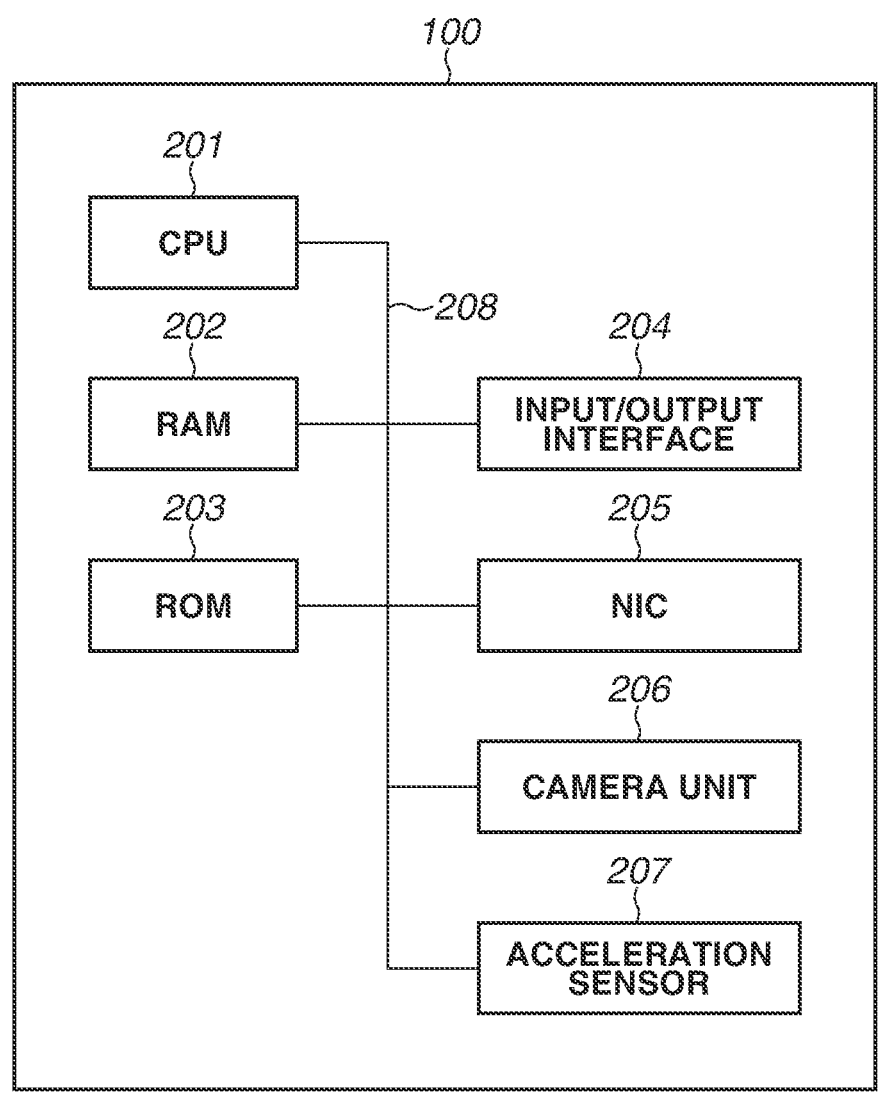
FIG. 2 is a diagram illustrating an example of a hardware configuration of the mobile terminal.

FIG. 2 is a diagram illustrating an example of a hardware configuration of the mobile terminal 100. The mobile terminal 100 includes various units (201 to 208). A central processing unit (CPU) 201 executes various programs, and accordingly implements various functions. A random access memory (RAM) 202 stores various kinds of information. The RAM 202 is also used as a temporary work area of the CPU 201. A read only memory (ROM) 203 is a storage medium for storing various programs. The ROM 203 may be a storage medium such as a flash memory, a solid state disk (SSD), or a hard disk drive (HDD). The CPU 201 loads a program stored in the ROM 203 into the RAM 202 and executes the loaded program. The CPU 201 accordingly functions as each processing unit of the mobile application illustrated in FIG. 3, and executes processing in each step of a sequence to be described below. All or a part of the function of each processing unit of the mobile application and the processing according to the sequence to be described below is not limited to the implementation by the CPU 201, and may be implemented using a piece of exclusive hardware.

An input/output interface 204 transmits and receives data to and from the touch panel 102. A network interface card (NIC) 205 is a unit provided to connect the mobile terminal 100 to a network (not illustrated). A camera unit 206 is connected to the camera 104, and captures an image of the subject 105 into the mobile terminal 100. An acceleration sensor 207 is provided to measure acceleration (a rate of change in speed) of the mobile terminal 100. Each unit described above is configured to transmit and receive data via a bus 208.

Figure 3:
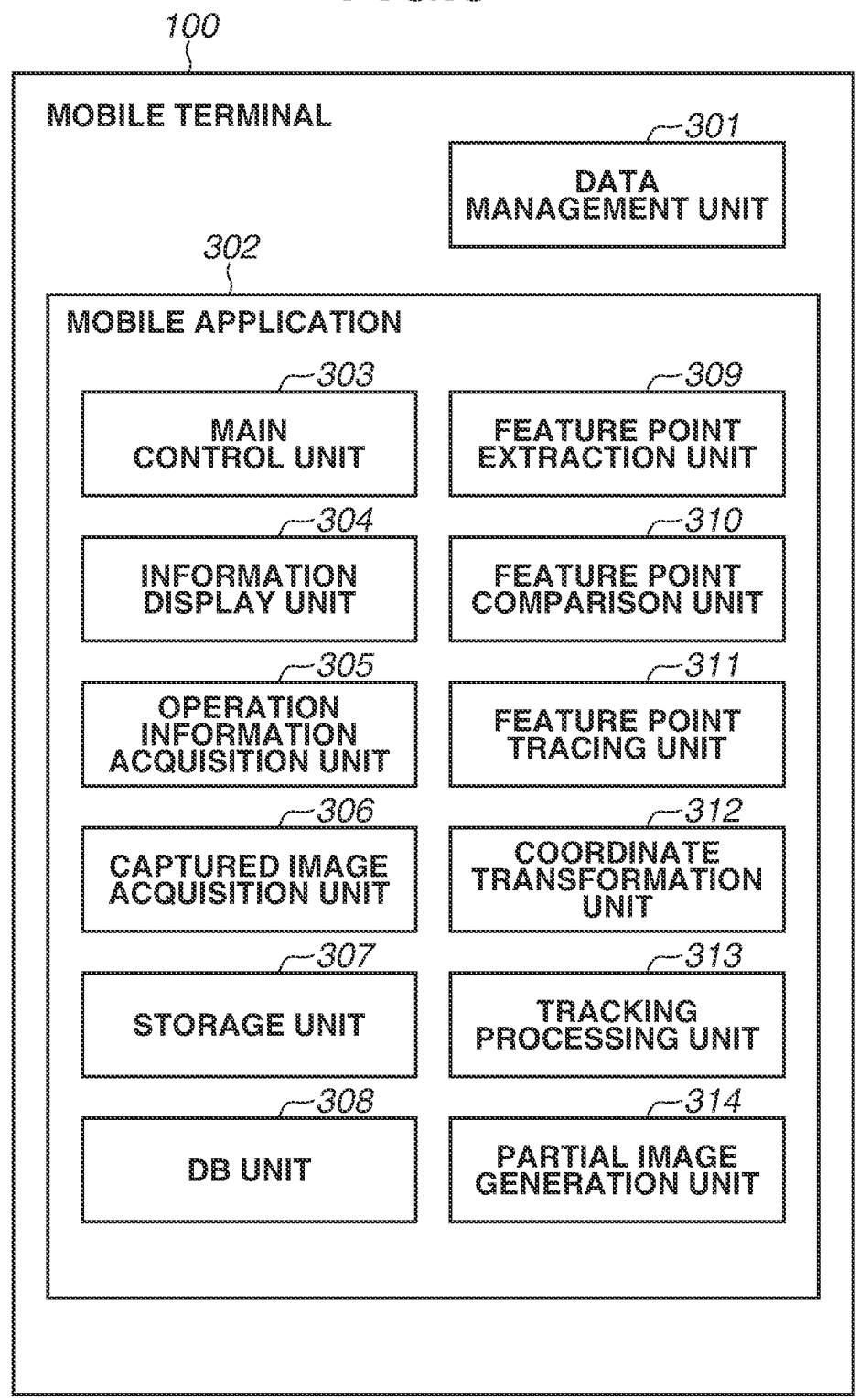
FIG. 3 is a diagram illustrating an example of a software configuration of the mobile terminal.

FIG. 3 is a diagram illustrating an example of a software configuration of the mobile terminal 100. A storage device such as the ROM 203 stores a program for implementing each function processing unit (each module unit of the mobile application) in the mobile application illustrated in FIG. 3. An operating system (OS) (not illustrated) of the mobile terminal 100 has a data management unit 301.

The data management unit 301 manages images and software application data. The OS provides a control application programming interface (API) for using the data management unit 301. By using the control API, the mobile application acquires and stores images and software application data to be managed by the data management unit 301.

A mobile application 302 is a software application downloaded and installed using an installation function of the OS of the mobile terminal 100, from a site such as an application store of each OS. The mobile application 302 performs various kinds of data processing for an image of the subject 105 captured via the camera unit 206.

A main control unit 303 is provided to control each of the module units (304 to 314) included in the software application (the mobile application 302) for the mobile terminal 100 while allowing corporation among these mobile units.

Figure 4:
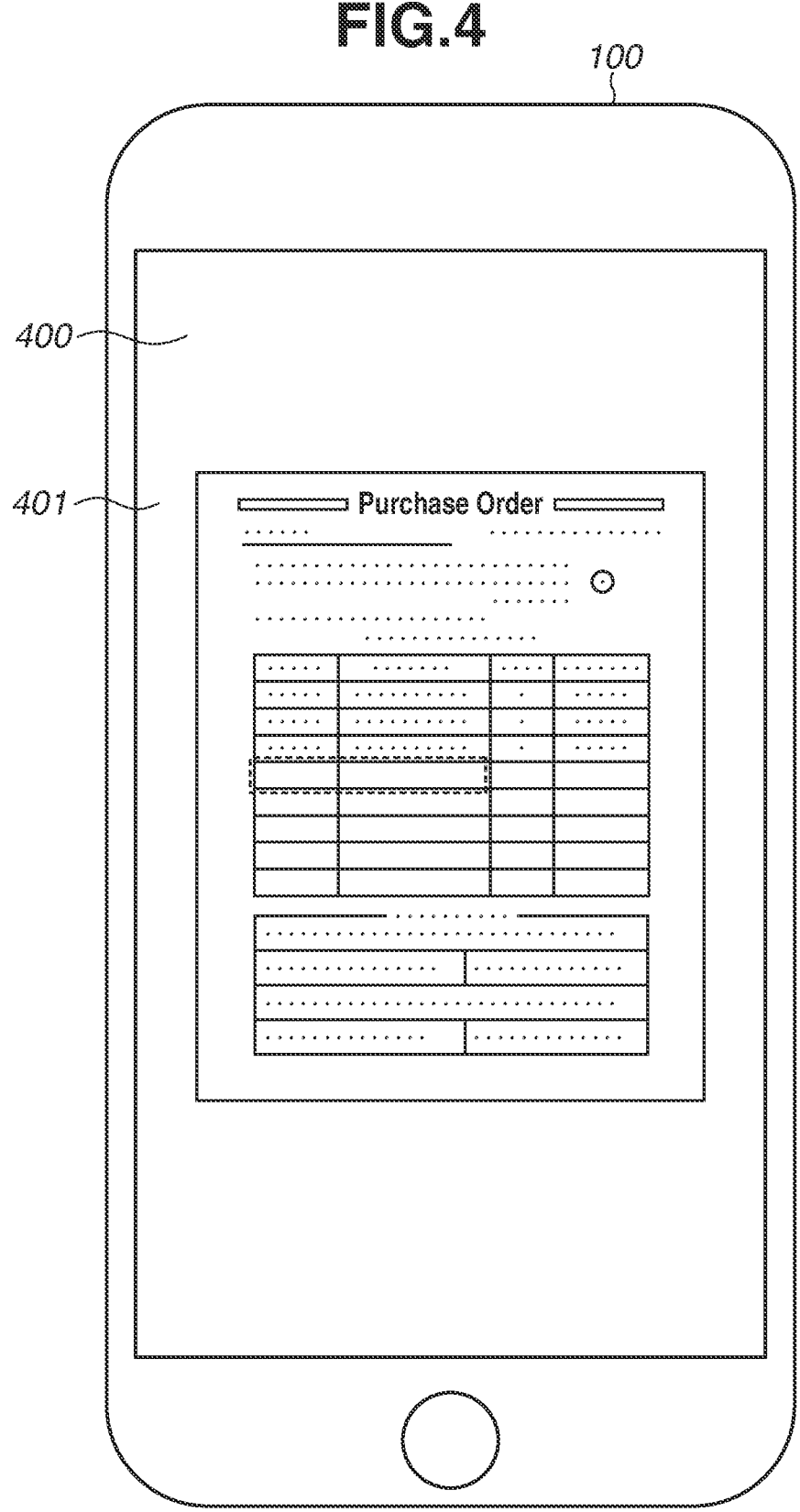
FIG. 4 is a diagram illustrating an example of a user interface (UI) of a mobile application.

An information display unit 304 displays a user interface (UI) of the mobile application 302 on a screen for the user, according to an instruction from the main control unit 303. FIG. 4 is a diagram illustrating an example (a mobile terminal screen 400) of a screen providing a UI (a UI for a portable terminal) of the mobile application 302. The mobile terminal screen 400 is displayed on the touch panel 102 of the mobile terminal 100. In the mobile terminal screen 400, an image captured via the camera 104 is displayed in an area 401 for performing display and operations. Further, the mobile terminal screen 400 receives an operation (a user operation) performed by the user on information such as an image, via the displayed UI. The form (such as the position, size, range, layout, and display content) of the UI of the mobile application 302 is not limited to the example illustrated in FIG. 4, and can adopt an appropriate configuration that can implement each kind of processing to be described below.

An operation information acquisition unit 305 acquires information indicating the content of an operation performed by the user via the UI displayed by the information display unit 304, and notifies the main control unit 303 of the acquired information. For example, when the user touches the area 401 by hand, the operation information acquisition unit 305 senses information indicating the touched position on the screen, and transmits the sensed information indicating the position to the main control unit 303.

A captured image acquisition unit 306 acquires a photographic image such as a moving image captured with the camera unit 206, and transmits the acquired image to a storage unit 307. The storage unit 307 stores the photographic image acquired by the captured image acquisition unit 306. Further, the storage unit 307 can delete the stored captured image according to an instruction of the main control unit 303.

A database (DB) unit 308 has a database function. By using a data input area information table 601, the DB unit 308 manages an overall image 500 to be described below, and information indicating the position of a data input area (an OCR target area) describing data information to be extracted from the overall image 500. The data of the DB unit 308 is transmitted to the storage unit 307, at the start of the software application (the mobile application 302) by the main control unit 303. The transmitted data is acquired based on an instruction of the main control unit 303.

For an image such as an image captured with the camera unit 206, a feature point extraction unit 309 takes a portion such as an edge having a large change in luminance of the image, as a characteristic pixel point (a feature point). The feature point extraction unit 309 then calculates data (a feature amount) representing characteristics of the feature point. Examples of a method for obtaining the feature point and the feature amount thereof are scale-invariant feature transform (SIFT) and speeded-up robust features (SURF). The method for obtaining the feature point and the feature amount thereof is not limited to the above-described methods. However, it is preferable to adopt a method, which is robust against a change such as rotation, scaling, or movement of an image, and which allows a matching feature point to be uniquely determined in feature point comparison processing to be described below.

A feature point comparison unit 310 performs the feature point comparison processing to compare feature points extracted from the respective two different images by the feature point extraction unit 309. The feature point comparison processing can determine a combination of feature points matching with each other, by comparing a feature point as well as a feature amount of the feature point of one image with those of another image (can perform matching). Further, a method for estimating a regularity by removing an outlier, such as random sample consensus (RANSAC), may be used. A combination of feature points, which become noise, is removed using such a method, and accordingly matching can be performed with high accuracy. While the feature point comparison processing is a matching method performed with high accuracy, the processing speed of the processing is low, in general. In the present exemplary embodiment, the feature point comparison processing is performed between an overall image of a document (a form) in a known format prepared beforehand and a captured image taken with the camera unit 206.

A feature point tracing unit 311 extracts a feature point from a captured image (the original image) of a first frame of a captured moving image, by using the feature point extraction unit 309. The feature point tracing unit 311 accordingly performs feature point tracing processing (an optical flow) to estimate a movement position of the above-described feature point, on a captured image of a second frame being subjected to comparison. The feature point tracing processing estimates a movement vector that indicates in which direction and how far the feature point on the original image has moved in the image to be compared. It is therefore possible to estimate the position of the image to be compared, to which the feature point in the original image has moved. In the feature point tracing processing by the feature point tracing unit 311, the processing speed is higher than that in the feature point comparison processing by the feature point comparison unit 310. However, to calculate a movement vector in the feature point tracing processing with accuracy, the movement amount of the object is a certain amount or less between the two images (the captured image of the first frame and the captured image of the second frame) (i.e., the difference between the images is small).

A coordinate transformation unit 312 performs mapping of a point, by calculating a homography transformation matrix (hereinafter referred to as "transformation matrix") for performing homography transformation (homography transform, or plane projection transformation) between the two images (between the overall image and the captured image, or between the captured image of the first frame and the captured image of the second frame). The homography transformation can transform a point on a plane coordinate system into a point on a different plane coordinate system and accordingly translocate the point. As a similar method, there is affine transformation for performing rotation, translation, and scaling of an image. In addition to that, the homography transformation can perform trapezoidal transformation, by changing the ratio of the scaling according to a coordinate position. The homography transformation can be expressed as follows, using coordinates (x1, y1) on an image to be transformed, coordinates (x2, y2) on an image after the transformation, a transformation matrix H, and a constant s. The expression of the transformation matrix is not limited to the following expression (a matrix). The expression of the transformation matrix may be in any form of expression, if the expression is a transformation for transforming a coordinate system of one of two images into that of another. Such a transformation (a transformation matrix) is used as transformation information in transforming a coordinate system of one of two images into another.

$$H\begin{pmatrix} x_1 \\ y_1 \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} x_1 \\ y_1 \\ 1 \end{pmatrix} = \begin{pmatrix} s*x_2 \\ s*y_2 \\ s \end{pmatrix} \quad (1)$$

In a case where a feature point to be extracted from the same object is present in each of two images, a parameter of the transformation matrix H is calculated based on correspondence-point coordinates between the images determined by matching processing of the feature point comparison unit 310 or the feature point tracing unit 311. The coordinates in a first image can be accordingly mapped in a second image, by obtaining a transformation matrix between the two images. Further, the inverse mapping can be performed, by obtaining the inverse matrix of the transformation matrix. However, in a case where the same object hardly exists in each of two images (in a case where the difference between images is large), the number of feature points for successful matching decreases, and the calculation of the transformation matrix H fails.

A tracking processing unit 313 performs tracking to find which part (area) of the overall image 500 corresponds to the latest captured image with the camera 104, by performing tracking processing described below. The tracking processing unit 313 performs rendering by mapping a data input area on the captured image, based on the result of the tracking, and the information of the data input area stored in the data input area information table 601. The rendered data input area is displayed on the mobile terminal screen 400. Therefore, after the latest captured image is acquired and until the image having the mapped data input area is displayed on the mobile terminal screen 400, the present exemplary embodiment waits for the completion of the processing to determine a transformation matrix between the overall image 500 and the latest captured image by the coordinate transformation unit 312. Matching processing for feature points between two images is used to calculate the transformation matrix by the coordinate transformation unit 312. There are two calculation methods for the matching processing. One is performed by the feature point comparison unit 310 and another is performed by the feature point tracing unit 311. The matching processing by the feature point comparison unit 310 takes a long time. Therefore, if rendering is not performed until the completion of the feature point comparison processing, the photographing rate declines. The feature point tracing processing by the feature point tracing unit 311 is fast. However, because tracking is performed by sequentially multiplying each transformation matrix between photographic frames, errors of the obtained transformation matrixes between the frames are accumulated. Therefore, if only the feature point tracing processing is performed by the feature point tracing unit 311, a deviation in a tracking result gradually grows. Hence, in the tracking processing described below, the feature point comparison processing and the feature point tracing processing are used in combination, while the deviation is corrected by regularly performing the feature point comparison processing. This prevents the decline in the photographing rate in rendering for the mobile terminal screen 400, while minimizing the deviation in the tracking.

A partial image generation unit 314 generates an image (a partial image) corresponding to a part clipped from the overall image 500.

Figure 5:
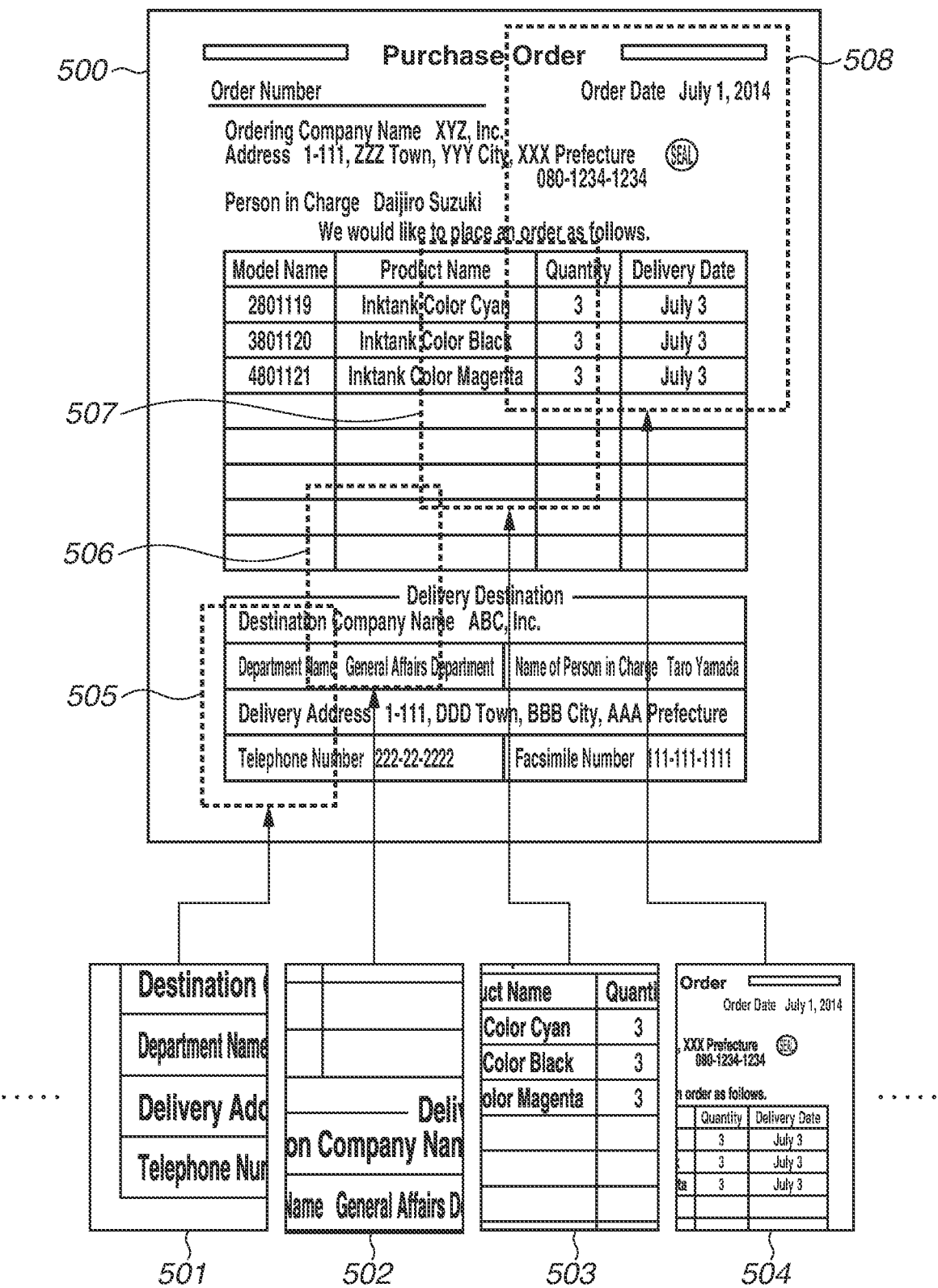
FIG. 5 is a diagram illustrating an example of an overall image and a captured image.

Next, the overall image and the captured image will be described with reference to FIG. 5. The overall image 500 is an example of a document image prepared beforehand. The overall image 500 is image data about the overall image of the subject 105 and stored in the DB unit 308 beforehand, but is not limited to this example. For example, the overall image 500 may be acquired by performing processing based on image data acquired first by photographing the entire subject 105. Examples of the processing include paper-surface detection processing for deleting an area except for a subject, and shaping processing such as distortion correction processing for correcting a distorted part. This flow of acquiring the overall image 500 may be added to the software application 302. Further, the overall image 500 may be a document image in a known format including only a table frame and a fixed character string part of a document such as a business form (an image before a character string is entered in a data input area).

The image of each frame of a part (or the whole) of the subject 105 is obtained by photographing the subject 105 with the camera 104 in moving-image photographing. This image is referred to as a captured image. Each of captured images 501, 502, 503, and 504 is an example of the images of each frame obtained in moving-image photographing. Further, captured areas 505, 506, 507, and 508 indicate areas corresponding to the captured images 501, 502, 503, and 504, respectively, in the overall image 500. In other words, each of the captured images 501 to 504 is an example of an image extracted from a moving image acquired by the captured image acquisition unit 306. The captured areas 505 to 508 indicate how the area changes according to a movement of the camera 104.

Next, the data input area information table 601 stored in the DB unit 308 will be described. FIG. 6 is a diagram illustrating an example of a data structure of a data input area information table, and an example of information about a data input area (an OCR processing target area) held in this table, according to the present exemplary embodiment. The data input area information table 601 includes an id column, a key column, a point column, a width column, and a height column. The id column stores a value incremented by one each time a record is added to the data input area information table 601. The id column is the primary key of a table. The key column stores a kind of the data input area information of each record. The point column stores the coordinates of the upper left end of the data input area in the coordinate system of the overall image 500. The width column stores information indicating the width of the data input area in units of pixel. The height column stores information indicating the height of the data input area in units of pixel. Further, areas 608 to 613 illustrated on the overall image 500 in FIG. 6 indicate areas corresponding to data input area information pieces 602 to 607, respectively, of the data input area information table 601.

Next, the tracking processing by the tracking processing unit 313 will be described with reference to FIG. 7. Transformation information to be used for coordinate transformation between two images will be described as "transformation matrix". However, as mentioned in the description of the coordinate transformation unit 312, the transformation information is not limited to the matrix, and may be other transformation expressions (other transformation information). Captured images 700 to 708 are sequentially captured images of a moving image acquired from the captured image acquisition unit 306. The captured images 700 to 708 are captured by the camera 104 brought close to the subject 105. Among these images, the captured image 700 is the first captured image acquired upon the start of photographing. A first transformation matrix 709 is a transformation matrix determined by the coordinate transformation unit 312, by using a feature point comparison result determined by the feature point comparison unit 310, based on the overall image 500 prepared beforehand and the captured image 700 used as inputs. The processing of the feature point comparison unit 310 takes a long time and therefore, the captured images 701 and 702 are each acquired as a frame image of the moving image before the first transformation matrix 709 is calculated. At this moment, because the first transformation matrix 709 has not yet been generated, the position of the data input area cannot be determined, and the captured images 701 and 702 are displayed on the mobile terminal screen 400 as is.

Figure 7:
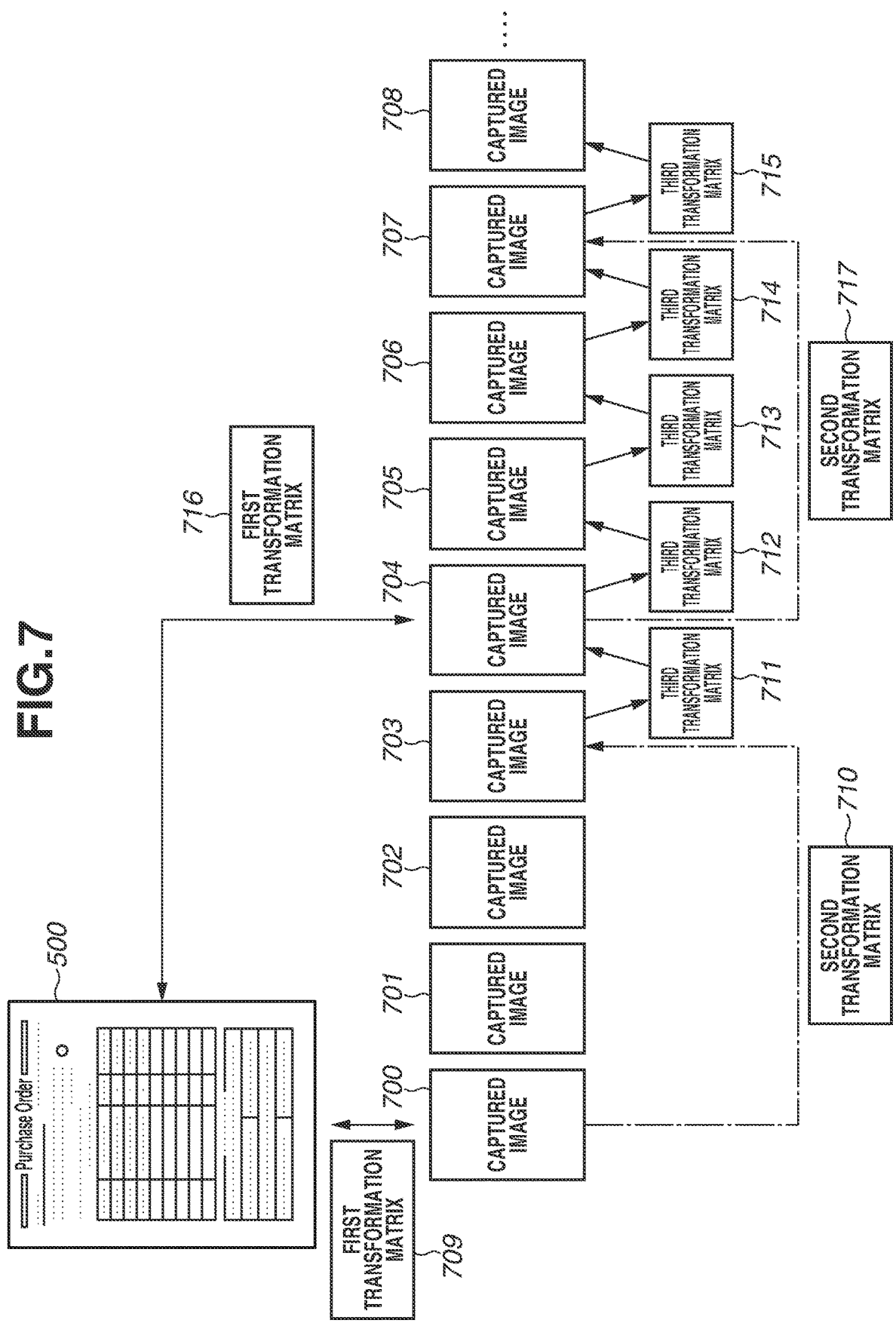
FIG. 7 is a diagram illustrating an example of tracking processing.

Assume that, in the example in FIG. 7, at the time when the captured image 703 is acquired, the calculation of the first transformation matrix 709 by the coordinate transformation unit 312 is completed, and the first transformation matrix 709 is obtained. At this moment, a second transformation matrix 710 is generated. The second transformation matrix 710 is obtained by the coordinate transformation unit 312, using the result of the execution of the feature point tracing processing in the feature point tracing unit 311, based on the captured image 700 used for the calculation of the first transformation matrix 709 and the latest captured image 703 as input images. Further, a transformation matrix that allows transformation of coordinates between the overall image 500 and the captured image 703 is obtained by multiplying the first transformation matrix 709 and the second transformation matrix 710. Based on the obtained transformation matrix, and the data input area information stored in the data input area information table 601, each data input area is mapped and rendered on the captured image 703, and then displayed on the mobile terminal screen 400.

Subsequently, the coordinate transformation unit 312 obtains a third transformation matrix 711, by using the result of the execution of the feature point tracing processing in the feature point tracing unit 311, based on the latest captured image 704 and the just-preceding captured image 703 as input images. Further, a transformation matrix that allows transformation of coordinates between the overall image 500 and the captured image 704 is obtained by multiplying the first transformation matrix 709, the second transformation matrix 710, and the third transformation matrix 711. Similarly, third transformation matrixes 712 to 715 are each obtained between the latest captured image and the just preceding captured image. Afterward, a transformation matrix that allows transformation of coordinates between the overall image 500 and the latest captured image (any of the captured images 704 to 708), by multiplying the first transformation matrix 709, the second transformation matrix 710, and one or a plurality of the third transformation matrixes.

However, the accuracy of the transformation matrix obtained by the coordinate transformation unit 312 is not 100%, due to the influence of an estimation error of the feature point tracing processing by the feature point tracing unit 311. Therefore, errors are accumulated by multiplying a plurality of transformation matrixes. For this reason, the first transformation matrix and the second transformation matrix are regularly updated to reset the accumulation of the errors. A first transformation matrix 716 is a transformation matrix obtained by the coordinate transformation unit 312, using the feature point comparison result obtained by the feature point comparison unit 310, based on the overall image 500 and the captured image 704 used as inputs. As with the determination of the first transformation matrix 709, the calculation of the first transformation matrix 716 takes a long time. Therefore, the captured images 705 and 706 are acquired before the first transformation matrix 716 is calculated. In this process, each time the captured images (the captured images 705 and 706) is acquired, a third transformation matrix (third transformation matrixes 712 and 713) is calculated with respect to the just preceding captured image. Subsequently, using the first transformation matrix 709 and the second transformation matrix 710 already generated as well as the third transformation matrixes 711, 712, and 713, a transformation matrix for transforming coordinates between the latest captured image 706 and the overall image 500 can be obtained. Further, assume that, at the time when the captured image 707 is acquired, the calculation of the first transformation matrix 716 by the coordinate transformation unit 312 is completed and the first transformation matrix 716 is obtained. At this moment, a second transformation matrix 717 is generated. The coordinate transformation unit 312 obtains the second transformation matrix 717, by using the result of the execution of the feature point tracing processing in the feature point tracing unit 311, based on the captured image 704 used for the calculation of the first transformation matrix 716 and the latest captured image 707 as input images. At the time when the second transformation matrix 717 is obtained, updating of the first transformation matrix and the second transformation matrix is completed. For the captured images thereafter, a transformation matrix for transforming coordinates between the overall image 500 and the latest captured image 708 is obtained, using the first transformation matrix 716 and the second transformation matrix 717 that are updated, as well as a third transformation matrix 715 between the captured images. Because the first transformation matrix and the second transformation matrix are thus updated, the third transformation matrixes 711 to 714 are not necessary for tracking in the latest captured image. Therefore, errors caused by multiplying these third transformation matrixes are reset. In this way, the first transformation matrix and the second transformation matrix are regularly updated, and accordingly errors in the tracking can be kept at a minimum.

<Basic Flow>

Next, a basic tracking processing flow of the present exemplary embodiment will be described with reference to FIG. 8. The CPU 201 of the mobile terminal 100 executes the mobile application 302, accordingly implementing the basic tracking processing flow. When the mobile application 302 in the mobile terminal 100 is started by the user, the camera 104 brought closed to the subject 10 acquires an image, accordingly triggering this flow.

In step S801, the main control unit 303 transmits the overall image 500 stored in the DB unit 308 to the storage unit 307 to allow use of the overall image 500 (i.e., the overall image is acquired).

In step S802, the main control unit 303 transmits the data input area information table 601 stored in the DB unit 308 to the storage unit 307 to allow use of the data input area information table 601 (i.e., the data input area information is acquired).

In step S803, the main control unit 303 orders acquisition of the latest frame of a moving image as one captured image, from the captured image acquisition unit 306 (i.e., the captured image is input).

In step S804, the main control unit 303 creates and updates the first and second transformation matrixes, by executing a processing flow of creating and updating the first transformation matrix and the second transformation matrix as described below.

In step S805, the main control unit 303 determines whether the creation of the first and second transformation matrixes is completed (whether tracking is possible) in step S804. If the creation is completed, i.e., the tracking is possible (YES in step S805), the processing proceeds to step S806. On the other hand, if the creation of the first and second transformation matrixes is not completed, i.e., the tracking is not possible (NO in step S805), the processing proceeds to step S810.

In step S806, the main control unit 303 instructs the feature point tracing unit 311 to perform the feature point tracing processing between the latest input captured image and the preceding input captured image. Further, the main control unit 303 instructs the coordinate transformation unit 312 to generate the third transformation matrix, based on the result of the feature point tracing processing. The coordinate transformation unit 312 generates the third transformation matrix, based on the coordinates of a plurality of feature points associated by the feature point comparison unit 310 between the latest captured image being compared and the just preceding captured image.

In step S807, the main control unit 303 instructs the coordinate transformation unit 312 to generate a transformation matrix that allows coordinate transformation between the overall image and the latest captured image, by using the generated first, second, and third transformation matrixes (i.e., perform the tracking processing).

In step S808, the main control unit 303 maps the four corners of the latest captured image on the overall image, by using the inverse matrix of the transformation matrix generated in step S807. The main control unit 303 accordingly generates quadrilateral information (formed of the coordinates of four vertices of a quadrilateral) on the overall image coordinate system. In other words, the main control unit 303 generates coordinate information indicating which position on the overall image corresponds to the position currently being photographed.

In step S809, the main control unit 303 stores the quadrilateral information generated in step S808.

In step S810, the main control unit 303 performs rendering processing. Specifically, the main control unit 303 maps a data input area (an OCR processing target area) on the overall image coordinate system stored in the data input area information table 601, onto the captured image. The data input area is mapped using the transformation matrix generated based on the first to third transformation matrixes in step S807, and the information of the data input area information table 601 stored in the storage unit 307. The mapped data input area is displayed as a guide, on the mobile terminal screen 400 of the mobile terminal 100. In a case where the tracking processing in step S807 is skipped after the input of the captured image, the captured image on which the data input area is not mapped is directly displayed on the mobile terminal screen 400.

In step S811, the main control unit 303 determines whether the input of the captured image by the captured image acquisition unit 306 is finished. If the input of the captured image is finished (YES in step S811), the flow ends.

If the input of the captured image is not finished (NO in step S811), the processing returns to step S803 to continue the flow.

<Detail Flow of Processing for Creating and Updating First and Second Transformation Matrixes (Step S804)>

Next, details of the processing for creating and updating the first and second transformation matrixes in step S804 in FIG. 8 will be described with reference to FIG. 9.

In step S901, the main control unit 303 determines whether the first transformation matrix has been already generated. If the first transformation matrix has been already generated (YES in step S901), the processing proceeds to step S902. If the first transformation matrix has not yet been generated (NO in step S901), the processing proceeds to step S905. As described below, also in a case where it is determined that it is currently the timing for updating the first transformation matrix in step S902, the feature point comparison processing is started in step S906, and the first transformation matrix is not updated, the main control unit 303 determines that the first transformation matrix for updating has not yet been generated (NO in step S901), and the processing proceeds to step S905.

In step S902, the main control unit 303 determines whether it is currently the timing for new updating of the first transformation matrix. In updating the first transformation matrix, the updating may be performed for the latest captured image at the timing when the first transformation matrix and the second transformation matrix have been already generated and a tracking path is established between the overall image and the latest captured image. Alternatively, the updating may be performed after a few frames are captured upon establishment of a tracking path. In either case, the main control unit 303 determines to update the first transformation matrix regularly. If the main control unit 303 determines that it is currently not the timing for new updating of the first transformation matrix (NO in step S902), the processing proceeds to step S903. If the main control unit 303 determines that it is currently the timing for new updating (YES in step S902), the processing proceeds to step S906.

In step S903, the main control unit 303 determines whether the second transformation matrix has been already generated. If the second transformation matrix has been already generated (YES in step S903), the processing proceeds to step S904. If the second transformation matrix has not yet been generated (NO in step S903), the processing proceeds to step S909.

In step S904, the main control unit 303 determines whether the first transformation matrix has been updated. If the first transformation matrix has been updated (YES in step S904), the processing proceeds to step S909. If the first transformation matrix has not been updated (NO in step S904), the flow ends.

In step S905, the main control unit 303 determines whether the feature point comparison processing by the feature point comparison unit 310 is being performed. If the feature point comparison processing is not being performed (NO in step S905), the processing proceeds to step S906. If the feature point comparison processing is being performed (YES in step S905), the processing proceeds to step S907.

In step S906, the main control unit 303 instructs the feature point comparison unit 310 to start the feature point comparison processing between the overall image and the latest captured image, and then the flow ends. In a case where it is determined that it is currently the timing for updating the first transformation matrix in step S902, and the feature point comparison processing is to be started, the processing is executed by narrowing down a comparison target part of the overall image, based on the result of the previous tracking. This will be described below with reference to FIG. 10.

In step S907, the main control unit 303 determines whether the feature point comparison processing by the feature point comparison unit 310 is completed. If the feature point comparison processing is completed (YES in step S907), the processing proceeds to step S908. If the feature point comparison processing is not completed (NO in step S907), the flow ends.

In step S908, the main control unit 303 instructs the coordinate transformation unit 312 to generate, using the result of the feature point comparison processing performed by the feature point comparison unit 310, the first transformation matrix between the overall image and the captured image subjected to the feature point comparison processing. The coordinate transformation unit 312 generates the first transformation matrix, based on the coordinates of a plurality of feature points in the overall image and the coordinates of a plurality of feature points in the captured image subjected to the comparison, which are associated by the feature point comparison unit 310. In a case where the generated first transformation matrix is the first transformation matrix for updating, the processing for updating the first transformation matrix is also performed. Upon completion of the updating and the generation of the first transformation matrix, the processing proceeds to step S901 to continue this flow.

In step S909, the main control unit 303 instructs the feature point tracing unit 311 to perform the feature point tracing processing between the captured image (the feature point comparison image) used in obtaining the first transformation matrix and the latest captured image. Further, the main control unit 303 instructs the coordinate transformation unit 312 to generate the second transformation matrix based on the result of the feature point tracing processing. Upon completion of the generation of the second transformation matrix, the flow ends.

<Detailed Flow of Feature Point Comparison Processing>

Next, the feature point comparison processing will be described in detail with reference to FIG. 10. The feature point comparison processing begins in step S906, in a case where when determined that it is currently the timing for updating the first transformation matrix in step S902 in FIG. 9.

An image captured in a state where the camera 104 is brought close to a paper surface, is an image corresponding to a part of the overall image. Therefore, a scale difference between the captured image and the overall image is large. In this case, if a feature point comparison is performed between the captured image and the overall image, a candidate for a feature point, which matches with a feature point of the captured image at a predetermined threshold or more points, is found from a plurality of portions in the overall image. In such a situation, the feature point comparison processing may fail, because a portion matching with the feature point cannot be identified in the overall image. Therefore, the present exemplary embodiment makes it easy to identify a portion matching with the feature point of the captured image, by narrowing down a part to be subjected to comparison in the overall image using information of a position being tracked. Specifically, the feature point comparison is performed based on a partial image, which is clipped from the overall image based on the quadrilateral information (the quadrilateral information stored in step S809 in FIG. 8) obtained by mapping the image-taking position of the just preceding captured image on the overall image. In addition, because the comparison is performed between a feature point extracted from the partial image and a feature point extracted from the captured image, the feature point comparison takes only a short time, as compared with a case where a comparison is performed with all feature points extracted from the overall image.

An area to be clipped from the overall image as the partial image is set to be a rectangle of a slightly larger size covering the quadrilateral information that is the just preceding position information (e.g., a rectangle formed by increasing the width and height of the bounding rectangle of the quadrilateral at a predetermined enlargement rate (1.2 times)). This rectangle is set in consideration of the movement of the camera 104. Alternatively, an area to be clipped as the partial image may be set, by estimating a movement direction and a distance of the camera 104, from information indicating a rate of change in speed detected by the acceleration sensor 207. The partial image to be clipped by the partial image generation unit 314 will be described with reference to an example in FIG. 11. Assume that the quadrilateral information stored in step S809 in FIG. 8 is an image-taking position 1101 for an overall image 1100 (i.e., an image-taking position corresponding to a preceding captured image 1103, in the overall image 1100). In this case, an area 1102 to be clipped as a partial image 1104 is set as an area of a slightly larger size than the image-taking position 1101 corresponding to the just preceding captured image 1103.

Figure 8:
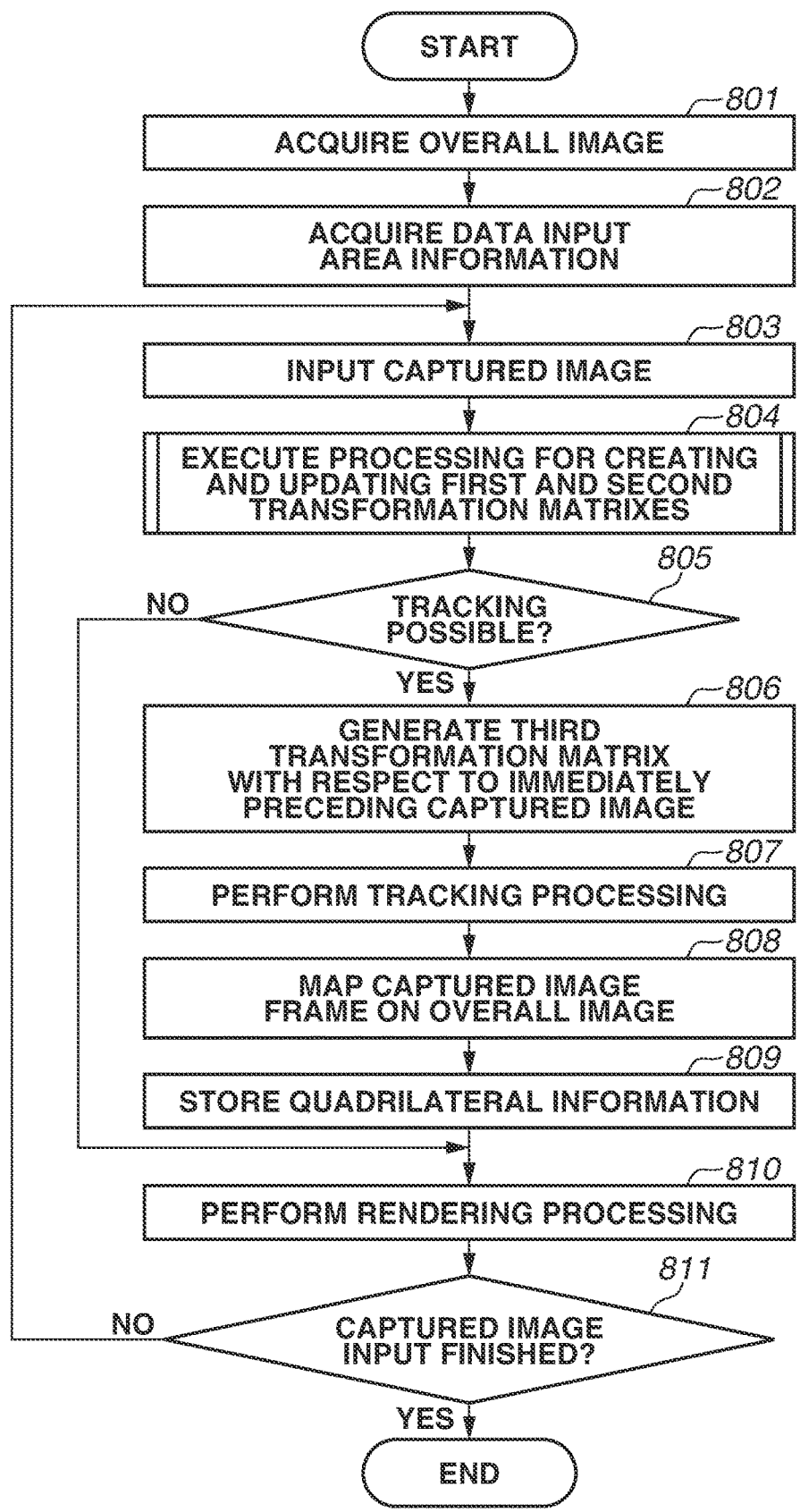
FIG. 8 is a diagram illustrating a basic processing flow.
Figure 9:
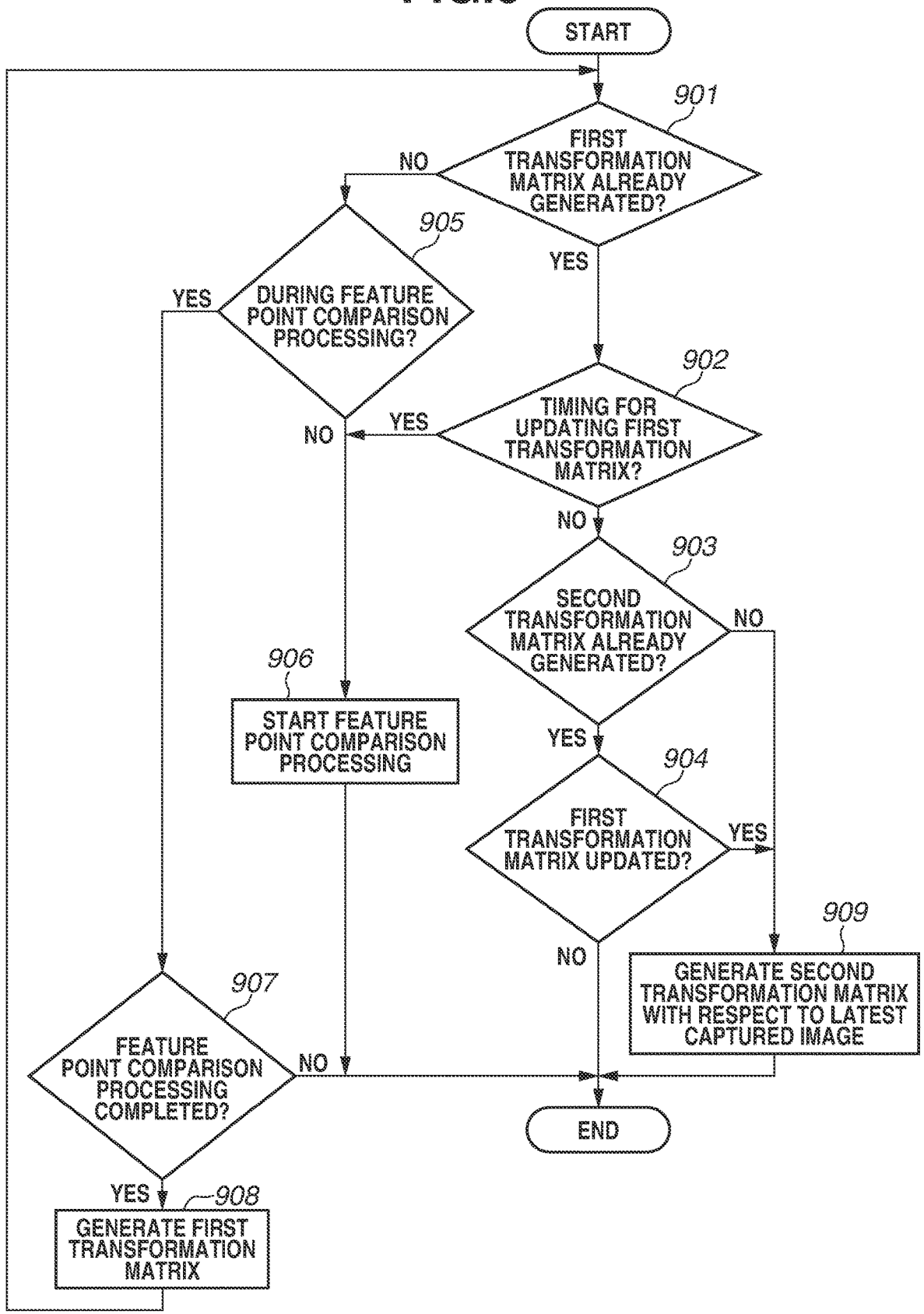
FIG. 9 is a diagram illustrating a flow for creating and updating first and second transformation matrixes.

In step S1001, the feature point comparison unit 310 instructs the partial image generation unit 314 to clip and generate a partial image from the overall image, based on the quadrilateral information stored in step S809 in FIG. 8.

In step S1002, the feature point comparison unit 310 compares a feature point extracted from the generated partial image and a feature point of the captured image, accordingly identifying a portion matching with the captured image in the partial image.

In step S1003, the feature point comparison unit 310 determines whether the feature point comparison between the partial image and the captured image is successful (whether a point matching with the captured image is successfully identified in the partial image). If the feature point comparison unit 310 determines that the feature point comparison is successful (YES in step S1003), the processing proceeds to step S1004. If the feature point comparison unit 310 determines that the feature point comparison is unsuccessful (NO in step S1003), the processing proceeds to step S1005.

In step S1004, the feature point comparison unit 310 transforms the coordinate information of the matching portion, which is identified in the partial image as the result of the feature point comparison, into the coordinate system of the overall image. The flow then ends. Using the coordinate information of the feature point in the coordinate system of the overall image transformed in this step S1004 and the coordinate information of the feature point of the captured image associated in step S1002, the coordinate transformation unit 312 generates the first transformation matrix for updating in step S908 described above.

In step S1005, the feature point comparison unit 310 compares the feature point of the overall image and the feature point of the captured image. In step S1005, because the comparison is performed with the overall image, there is a possibility that a candidate for the feature point matching with the feature point of the captured image at a predetermined threshold or more points may be found from a plurality of portions in the overall image. In such a case, i.e., in the case where the candidate is found from the plurality of portions in the overall image, for example, a point closest to the position of the partial image identified in step S1001 may be selected.

As described above, according to the present exemplary embodiment, in the feature point comparison processing between the overall image and the captured image, a part to be subjected to the comparison is narrowed down in the overall image, based on the image-taking position of the image captured before, in the overall image. Therefore, an improvement in accuracy and an improvement in processing speed are expected, when the feature point comparison processing is performed.

According to the information processing apparatus of the present exemplary embodiment, the accuracy of the tracking processing in moving-image photographing can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-128038, filed Jun. 29, 2017, which is hereby incorporated by reference herein in its entirety.

What is claimed is:

1. An information processing apparatus comprising:
a processor; and
a memory that stores instructions, wherein the processor executes the instructions to perform:
obtaining first transformation information to be used for coordinate transformation between a coordinate system in an overall image prepared beforehand and a coordinate system in a first captured image, by executing feature point comparison processing for comparing a feature point extracted from the overall image and a feature point extracted from the first captured image;
obtaining second transformation information to be used for coordinate transformation between the coordinate system in the first captured image and a coordinate system in a second captured image, by executing feature point tracing processing for tracing a position of a feature point in the second captured image when the first transformation information is obtained, based on the feature point extracted from the first captured image used in obtaining the first transformation information;
obtaining third transformation information to be used for coordinate transformation between a coordinate system in a captured image immediately before a third captured image and a coordinate system in the third captured image, by executing feature point tracing processing for tracing a position of a feature point in the third captured image, based on a feature point extracted from the captured image immediately before the third captured image;
mapping an image-taking position corresponding to the third captured image on the overall image, based on the first transformation information, the second transformation information, and the third transformation information;
generating a partial image from the overall image, based on the mapped image-taking position, in a case where the first transformation information is to be updated; and
updating the first transformation information by using transformation information for updating, upon obtaining the transformation information for updating to be used for coordinate transformation between the coordinate system in the overall image and a coordinate system in a fourth captured image, by executing feature point comparison processing for comparing the feature point extracted from the partial image and a feature point extracted from the fourth captured image to be used for updating of the first transformation information.

2. The information processing apparatus according to claim 1, wherein, in the updating, the first transformation information is updated using transformation information for updating, by obtaining the transformation information for updating to be used for coordinate transformation between the coordinate system in the overall image and the coordinate system in the fourth captured image, by transforming a matching portion found in the feature point comparison processing for comparing the feature point extracted from the partial image and the feature point extracted from the fourth captured image, into the coordinate system of the overall image.

3. The information processing apparatus according to claim 1, wherein the partial image to be generated is a partial image of a size larger than a size of the mapped image-taking position.

4. The information processing apparatus according to claim 1, wherein the partial image to be generated is an image of an area to be set based on the mapped image-taking position and information of a rate of change in speed detected by an acceleration sensor.

5. The information processing apparatus according to claim 1, wherein the processor executes the instructions to further perform:
mapping a data input area in the overall image on the third captured image, based on the first transformation information, the second transformation information, and the third transformation information.

6. A non-transitory storage medium on which is stored a computer program for causing a computer to perform:
obtaining first transformation information to be used for coordinate transformation between a coordinate system in an overall image prepared beforehand and a coordinate system in a first captured image, by executing feature point comparison processing for comparing a feature point extracted from the overall image and a feature point extracted from the first captured image;
obtaining second transformation information to be used for coordinate transformation between the coordinate system in the first captured image and a coordinate system in a second captured image, by executing feature point tracing processing for tracing a position of a feature point in the second captured image when the first transformation information is obtained, based on the feature point extracted from the first captured image used in obtaining the first transformation information;
obtaining third transformation information to be used for coordinate transformation between a coordinate system in a captured image immediately before a third captured image and a coordinate system in the third captured image, by executing feature point tracing processing for tracing a position of a feature point in the third captured image, based on a feature point extracted from the captured image immediately before the third captured image;
mapping an image-taking position corresponding to the third captured image on the overall image, based on the first transformation information, the second transformation information, and the third transformation information;
generating a partial image from the overall image, based on the mapped image-taking position, in a case where the first transformation information is to be updated; and
updating the first transformation information by using transformation information for updating, upon obtaining the transformation information for updating to be used for coordinate transformation between the coordinate system in the overall image and a coordinate system in a fourth captured image, by executing feature point comparison processing for comparing the feature point extracted from the partial image and a feature point extracted from the fourth captured image to be used for updating of the first transformation information.

7. The non-transitory storage medium according to claim 6, wherein, in the updating, the first transformation information is updated using transformation information for updating, by obtaining the transformation information for updating to be used for coordinate transformation between the coordinate system in the overall image and the coordinate system in the fourth captured image, by transforming a matching portion found in the feature point comparison processing for comparing the feature point extracted from the partial image and the feature point extracted from the fourth captured image, into the coordinate system of the overall image.

8. The non-transitory storage medium according to claim 6, wherein the partial image to be generated is a partial image of a size larger than a size of the mapped image-taking position.

9. The non-transitory storage medium according to claim 6, wherein the partial image to be generated is an image of an area to be set based on the mapped image-taking position and information of a rate of change in speed detected by an acceleration sensor.

10. The non-transitory storage medium according to claim 6, wherein the computer program causes the computer to further perform:
mapping a data input area in the overall image on the third captured image, based on the first transformation information, the second transformation information, and the third transformation information.

11. An information processing method comprising:
obtaining first transformation information to be used for coordinate transformation between a coordinate system in an overall image prepared beforehand and a coordinate system in a first captured image, by executing feature point comparison processing for comparing a feature point extracted from the overall image and a feature point extracted from the first captured image;
obtaining second transformation information to be used for coordinate transformation between the coordinate system in the first captured image and a coordinate system in a second captured image, by executing feature point tracing processing for tracing a position of a feature point in the second captured image when the first transformation information is obtained, based on the feature point extracted from the first captured image used in obtaining the first transformation information;
obtaining third transformation information to be used for coordinate transformation between a coordinate system in a captured image immediately before a third captured image and a coordinate system in the third captured image, by executing feature point tracing processing for tracing a position of a feature point in the third captured image, based on a feature point extracted from the captured image immediately before the third captured image;
mapping an image-taking position corresponding to the third captured image on the overall image, based on the first transformation information, the second transformation information, and the third transformation information;
generating a partial image from the overall image, based on the mapped image-taking position, in a case where the first transformation information is to be updated; and
updating the first transformation information by using transformation information for updating, upon obtaining the transformation information for updating to be used for coordinate transformation between the coordinate system in the overall image and a coordinate system in a fourth captured image, by executing feature point comparison processing for comparing the feature point extracted from the partial image and a feature point extracted from the fourth captured image to be used for updating of the first transformation information.

* * * * *